United States Patent Office
2,840,616
Patented June 24, 1958

2,840,616

PRODUCTION OF THYMOL

Robert R. Bottoms, Crestwood, Ky., assignor to National Cylinder Gas Company, Chicago, Ill., a corporation of Delaware No Drawing. Application April 19, 1955
Serial No. 502,516

7 Claims. (Cl. 260—626)

This invention relates to a method of producing thymol from isomers of thymol. More particularly, this invention relates to a method of converting thymol isomers to thymol by sulfonation, isomerization of the resulting sulfonic acids, and desulfonation of the sulfonic acids to produce a mixture of thymol and thymol isomers from which thymol can readily be recovered.

Thymol is 2-isopropyl-5-methylphenol and is a natural substance contained in many ethereal oils such as oil of thyme. It is useful as an antiseptic in medicine, and also for the destruction of molds and parasites. In addition, it is a valuable intermediate in the production of synthetic menthol by catalytic hydrogenation.

Many methods of synthesizing thymol have been described in the prior art. While these methods are generally useful for the synthesis of thymol, they all suffer the disadvantage that substantial quantities of isomers of thymol are produced concurrently with thymol. These by-products cut down the yields of the syntheses, and make the processes more complicated in that the purification of the product involves additional steps and operations. The isomers of thymol are produced in very large quantities, and these materials have no recognized utility. The relative amount of thymol rarely exceeds 20% of the total phenolic material produced. Therefore, a method for converting these undesirable by-products into useful materials has important economic significance.

The object of this invention is to convert undesirable isomers of thymol into thymol. Another object of this invention is to increase the efficiency of thymol syntheses by providing a method whereby undesirable by-products of such syntheses are converted into thymol. Still another object of this invention is a method of isopropylating m-cresol to thymol in high yield. A further object of the invention is to suppress the formation of thymol isomers in the synthesis of thymol from m-cresol by addition of substantial amounts of water to the reaction mixture. Other objects of the invention will be apparent from the following disclosure.

According to this invention, isomers of thymol, that is substances having the general formula

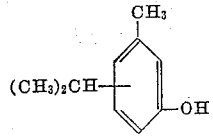

wherein the isopropyl radical is located at one of the positions other than that ortho to the hydroxyl radical and para to the methyl radical in the benzene ring, are sulfonated with concentrated sulfuric acid at moderate temperature, and the resulting mixture of sulfonic acids is heated at a temperature above 110° C. with at least 3 moles of water per mole of thymol isomer taken. During the period of heating with water, sulfonic acids derived from the thymol isomers are isomerized to thymol-sulfonic acid. The latter is then hydrolyzed to thymol by heating with a large excess of water at high temperature, and the resulting thymol is separated from the mixture of thymol isomers by fractional distillation and crystallization.

The presence of at least 3 moles of water per mole of phenolic material during the isomerization reaction is essential. If isomers of thymol are sulfonated, heated, and then desulfonated, no thymol can be isolated from the mixture of phenolic material. However, when 3 or more moles of water are present in accordance with the present invention, more than one-third of the thymol isomers can be converted to thymol.

The sulfonation of thymol isomers is conducted in the usual fashion for the sulfonation of phenolic materials. Concentrated sulfuric acid or fuming sulfuric acid can be used, and temperatures near 100° C. are suitable. Usually an excess of sulfuric acid is used, preferably about 2 moles or more. The isomerization step is conducted in the temperature range of 110° to 130° C. by heating the sulfonation reaction mixture with at least 3 moles of water. The isomerization reaction may be complete in less than an hour for small runs, and may require two to five hours for a larger operation. During the step of heating the sulfonation mixture with water, any disulfonic acids which are formed are preferentially hydrolyzed to monosulfonic acid, and the isopropyl substituent is transferred to the 2-position in the benzene ring. Thereafter the resulting monosulfonic acid of thymol is hydrolyzed (desulfonated) by heating the reaction product with a larger amount of water at temperatures above 110° C. In the desulfonation reaction, thymol is produced, as well as certain isomers of thymol which were not converted to thymol. The desulfonation reaction generally requires about one hour for small runs and longer periods for larger runs, although the time factor is not critical.

An important modification of the invention pertains to incorporation of the isomerization procedure into the synthesis of thymol from m-cresol. Instead of carrying out the isomerization on isomers of thymol, as is done in the ordinary application of the invention, the method may be made part of a more complex synthesis during which isomers of thymol are formed. The isomerization procedure operates to convert isomers of thymol to thymol, thus improving the efficiency of the synthesis.

In the manufacture of thymol from m-cresol, sulfonation of m-cresol and isopropylation of the resulting sulfonic acids are achieved by conventional procedures. Upon addition of 3 moles or more of water per mole of phenolic material and adjustment of the temperature of the reaction mixture to the appropriate range, conditions are established for the isomerization of thymol isomers to thymol. The water is added to the reaction mixture after the sulfonation is complete, and may be added prior to, during or following the isopropylation step.

In the past it has generally been the practice to remove water formed during the synthesis of thymol from m-cresol as rapidly as it is formed in order to force the reaction to completion. For example, Gump U. S. Patent No. 2,291,804 and Schollkopf et al. U. S. Patent No. 1,902,904 specifically disclose methods of producing thymol wherein the water produced during the reaction between m-cresol and isopropyl alcohol is removed as formed. The purpose of removing water is to force the reaction to completion and thereby to increase the yield of thymol obtained. Contrary to this teaching and totally unexpected on theoretical grounds, the present invention is based on the discovery that the presence of substantial amounts of water aids in the production of thymol.

In the synthesis of thymol from m-cresol, the isopropylating agent can be isopropyl alcohol, n-propyl alcohol, isopropyl ether, propylene, isopropyl sulfate, isopropyl acetate and similar isopropyl esters. All of these agents in the presence of sulfuric acid provide an isopropyl radical for introduction into the benzene ring of m-cresol. Of the foregoing isopropylating agents, isopropyl ether is preferred because of its availability, convenience, and low cost per isopropyl radical.

When m-cresol or thymol isomers are sulfonated, one mole of water per mole of phenol is produced and released. When this mixture is isopropylated with isopropyl alcohol, one mole of water per mole of m-cresol present is released. Therefore, if m-cresol and isopropyl alcohol are employed there will be present in the sulfonation mixture two moles of water per mole of phenolic material. This amount of water is insufficient to secure the benefit of the present invention, and it is therefore necessary to add an additional quantity of water equal to at least one mole and generally two or three moles per mole of phenolic material in order to bring about the ready desulfonation of disulfonic acids and the isomerization of thymol isomers to thymol.

The addition of water to the sulfonation mixture in quantities equal to about two to three moles of water per mole of phenolic material results in a large shift of the equilibrium in favor of the formation of thymol. Thymolsulfonic acid in a mixture of sulfonated isomers of thymol in the presence of water insufficient to cause complete hydrolysis of the sulfonic acid at moderately elevated temperatures (100° to 130° C.) is less stable and more easily hydrolyzed than sulfonated isomers. The above-mentioned shift of equilibrium of mixture of thymol and its isomers apparently results from the partial hydrolysis of thymolsulfonic acid and its effective removal from the equilibrium mixture of sulfonic acids. This permits the migration of isopropyl groups to form more thymol at the expense of the thymol isomers and thus tends to reestablish equilibrium conditions.

The present invention therefore includes the steps of heating in the range of about 100° to about 150° C. a mixture of sulfonated isopropylated m-cresol in the presence of at least three moles and preferably four to five moles of water per mole of phenolic material, desulfonating the sulfonic acids by hydrolysis, and separating the thymol from the other phenolic material.

In the manufacture of thymol by sulfonation and isopropylation of m-cresol according to the present invention or by the processes of the prior art, there is initially produced a quantity of tarry matter amounting variously to 5% to 10% of the phenolic material used. If this tarry material is collected and returned to the system in a subsequent batch, the further formation of the tarry material is suppressed, and thus loss of material and product are avoided. This tarry material may be recovered from each batch and returned to the next. Thus the initial tar is used repeatedly and does not appear to become ineffective in the suppression of tar formation in subsequent runs. This result may be explained on the assumption that some of the tarry material is one of the essential components of the equilibrium mixture of products. The composition of this tar has not been determined, but nevertheless, it satisfies the purpose of reducing further tar formation.

In order to hydrolyze the sulfonic acids to phenolic material, additional water is added and the mixture heated to a temperature in the range of 125° C. to the boiling point of the mixture. The amount of additional water can vary over a fairly wide range. In general, it is sufficient if at least 5 moles of water are present per mole of phenolic material and the amount of additional water to increase the total water to that value is sufficient. In practice usually 5 to 10 moles of water per mole of phenolic material are added to the reaction mixture after the isomerization step has been completed, and the resulting mixture is heated to reflux for a period of an hour or longer to achieve hydrolysis of the sulfonic acid substituents and liberation of thymol and thymol isomers.

As used herein, the term "phenolic material" means all substances containing a hydroxyl radical attached directly to a benzene ring and includes m-cresol, thymol, thymol isomers and diisopropylated m-cresol.

The invention is disclosed in further detail by following examples which are provided solely for the purpose of illustration and which are not intended to limit the invention in spirit or scope. It will be apparent to those skilled in the art that many modifications in relative amounts of materials, reagents and conditions may be made without departing from the invention. In the examples, relative amounts of materials are given in parts by weight, and temperatures are recorded in degrees centigrade.

Example 1

324 parts of m-cresol mixed with 750 parts of thymol isomers are sulfonated at 75° C. by the slow addition of 1600 parts of 66° Baumé sulfuric acid with good agitation. The mixture is maintained at 75° C. for four hours to insure completion of the reaction. 100 parts of tarry material from previous runs are added, followed by 300 parts of water, the addition of the latter being slow due to the exothermic dilution of the sulfuric acid. The temperature is allowed to arise to 100° to 115° C. during the addition of water. Then 153 parts of isopropyl ether are added slowly. The heat of reaction raises the temperature, but no cooling is ordinarily necessary. The mixture is then heated at 125° C. and agitated while 1300 parts of water are added slowly. After the addition of the water, the reaction mixture is heated to reflux for about 2 hours to insure complete desulfonation of the sulfonic acids. The mixture is then cooled and the oily layer is separated from the spent acid. Upon subjection of the phenolic material to distillation under reduced pressure, a thymol fraction is collected between 110° and 128° C. at 15 millimeters pressure, which amounts to about 560 parts. 100 parts of tarry residue remain in the still and may be reused. The thymol fraction is chilled and seeded with a few small crystals of thymol, and crystallization is allowed to go to completion. The crystalline thymol is collected by centrifugation and a yield of about 95% based upon the m-cresol used is obtained.

Example 2

1050 parts of thymol isomers are sulfonated with 1400 parts of 66° Baumé sulfuric acid as in Example 1. 400 parts of water are then added slowly and the mixture is heated at 115° to 125° C. for about two hours. 1000 parts of water are then added slowly with stirring at 125° C. and the mixture is refluxed for two hours. Upon fractionation of the mixed phenols and crystallization of the thymol fraction, 375 parts of crystalline thymol are recovered, amounting to a conversion of more than 35% of the isomers to thymol.

Example 3

To 432 parts of m-cresol, 800 parts of 96% sulfuric acid are added slowly and with good agitation at a temperature below 80° C. The mixture is heated for two hours to complete the sulfonation. 50 parts of tarry material from a previous run are added, followed by 150 parts of water. The water is introduced slowly and cautiously so that the temperature does not rise above 115° C. After the water has been added, 240 parts of isopropyl alcohol are added slowly, and the reaction mixture is heated at 125° to 130° C. and agitated until the heat of reaction subsides. The mixture is then heated at 130° C. for two hours while 600 parts of water are added. The mixture is then cooled and the oily layer separated. This layer, which contains thymol and thymol isomers, is subjected to fractional distillation under reduced pressure. The yield of thymol distilling between 110° and 128° C. at 15 millimeters pressure amounts to about 300 parts. This fraction is chilled and treated with thymol crystals, and the crystalline material is collected by centrifugation. The yield of crystalline thymol is about 225 parts.

What is claimed as new and desired to be obtained by Letters Patent of the United States is:

1. In the method of converting an isomer of thymol to thymol by sulfonation and subsequent desulfonation, the improvement which comprises adding to the sulfonation reaction mixture sufficient water to provide at least 3 and not more than 5 moles of water per mole of phenolic material present and heating the resulting mixture at a temperature in the range of 110° to 130° C. to convert isomers of thymol to thymol.

2. A method of converting an isomer of thymol to thymol which comprises sulfonating said isomer of thymol, adding sufficient water to the sulfonation reaction mixture to provide at least 3 and not more than 5 moles of water per mole of phenolic material present, maintaining the resulting mixture at a temperature in the range of 110° to 130° C. to isomerize the isomers of thymol sulfonic acid to thymol sulfonic acid and then desulfonating the thymol sulfonic acid by adding sufficient water to provide more than 5 moles of water per mole of phenolic material present and heating the resulting mixture at a temperature above 125° C.

3. A method of converting isomers of thymol to thymol which comprises sulfonating said isomers of thymol with sulfuric acid, adding at least 3 and not more than 5 moles of water per mole of thymol isomers, heating the resulting mixture at a temperature of at least 110° C. and not more than 130° C., desulfonating the sulfonic acid by heating with additional water, and separating the thymol from the reaction mixture.

4. In a method of producing thymol from m-cresol by sulfonation and isopropylation of m-cresol, the step which comprises adding to the reaction mixture at least 2 and not more than 4 moles of water per mole of m-cresol, and heating the resulting mixture at a temperature in the range of 110° to 130° C., and separating from the reaction mixture the thymol thus formed.

5. A method of producing thymol from m-cresol which comprises sulfonating m-cresol with sulfuric acid at a temperature below 100° C., isopropylating the cresol sulfonic acid thus produced with an isopropylating agent, heating said sulfonation mixture with at least 3 and not more than 5 moles of water per mole of starting cresol at a temperature above 110° C. but not above 130° C., desulfonating the resulting thymol sulfonic acid by heating said thymol sulfonic acid with an excess of water at a temperature above 125° C., and separating the thymol thus formed from the reaction mixture.

6. The method of producing thymol from m-cresol which comprises heating m-cresol with 2 moles of sulfuric acid of density of at least 1.8 at a temperature of 50–80° over a period of two hours, adding to the reaction mixture at least 3 and not more than 5 moles of water per mole of m-cresol, heating said mixture at a temperature of 110 to 130° C. for two hours, isopropylating the resulting m-cresol sulfonic acid with isopropyl ether, heating said resulting mixture for a period of four hours, desulfonating the resulting thymol sulfonic acid by adding additional water and refluxing the reaction mixture for a period of four hours, and separating the thymol thus formed.

7. The method of claim 6 wherein tar from a previous run is added to the reaction mixture to suppress the formation of further tar.

References Cited in the file of this patent

UNITED STATES PATENTS

| | | |
|---|---|---|
| 1,876,435 | Schollkopf et al. | Sept. 6, 1932 |
| 1,972,599 | Perkins et al. | Sept. 4, 1934 |
| 2,468,670 | Huggett et al. | Apr. 26, 1949 |

FOREIGN PATENTS

| | | |
|---|---|---|
| 899,197 | Germany | Dec. 10, 1953 |

OTHER REFERENCES

Niederl et al.: Jour. Amer. Chem. Soc., vol. 53 (1931), pp. 1928–34 (7 pages).